United States Patent

[11] 3,537,389

| [72] | Inventor | John L. Villarreal<br>Norfolk, Virginia (4548 Clairmont St.,<br>Jacksonville, Fla. 32207) |
|------|----------|---|
| [21] | Appl. No. | 786,693 |
| [22] | Filed | Dec. 24, 1968 |
| [45] | Patented | Nov. 3, 1970 |

[54] APPARATUS FOR FRYING TACO SHELLS
12 Claims, 6 Drawing Figs.

[52] U.S. Cl. .................................................. 99/427,
 99/439, 99/448
[51] Int. Cl. ................................................ A47j 43/18
[50] Field of Search........................................... 99/427,
 443, 403—4, 407, 409, 416, 424, 426, 428, 430,
 432, 439, 441—2, 448; 249/91—96

[56] References Cited
UNITED STATES PATENTS

| 2,570,374 | 10/1951 | Pompa | 99/416 |
|-----------|---------|-------|--------|
| 2,719,480 | 10/1955 | Prickett et al. | 99/426 |
| 2,967,474 | 1/1961 | Ford | 99/427X |
| 3,020,826 | 2/1962 | Silva | 99/426 |
| 3,267,836 | 8/1966 | Yepis | 99/404 |
| 3,308,748 | 3/1967 | Jalbert | 99/426X |

*Primary Examiner*—Walter A. Scheel
*Assistant Examiner*—Arthur O. Henderson
*Attorney*—Low and Matthews ABSTRACT: An apparatus for frying taco shells which is substantially circular in cross section so as to be insertable into saucepans and the like found in the home. A plurality of inner molds are hingedly received within associated outer molds with each inner mold capable of being swung out independently whereby individual attention may be given to each taco shell. The outer molds are attached to a supporting structure and inclined at a slight angle to the horizontal so that the inner molds tend to remain in closed position.

Patented Nov. 3, 1970

INVENTOR
John L. Villarreal

BY *Low & Matthews*

ATTORNEYS

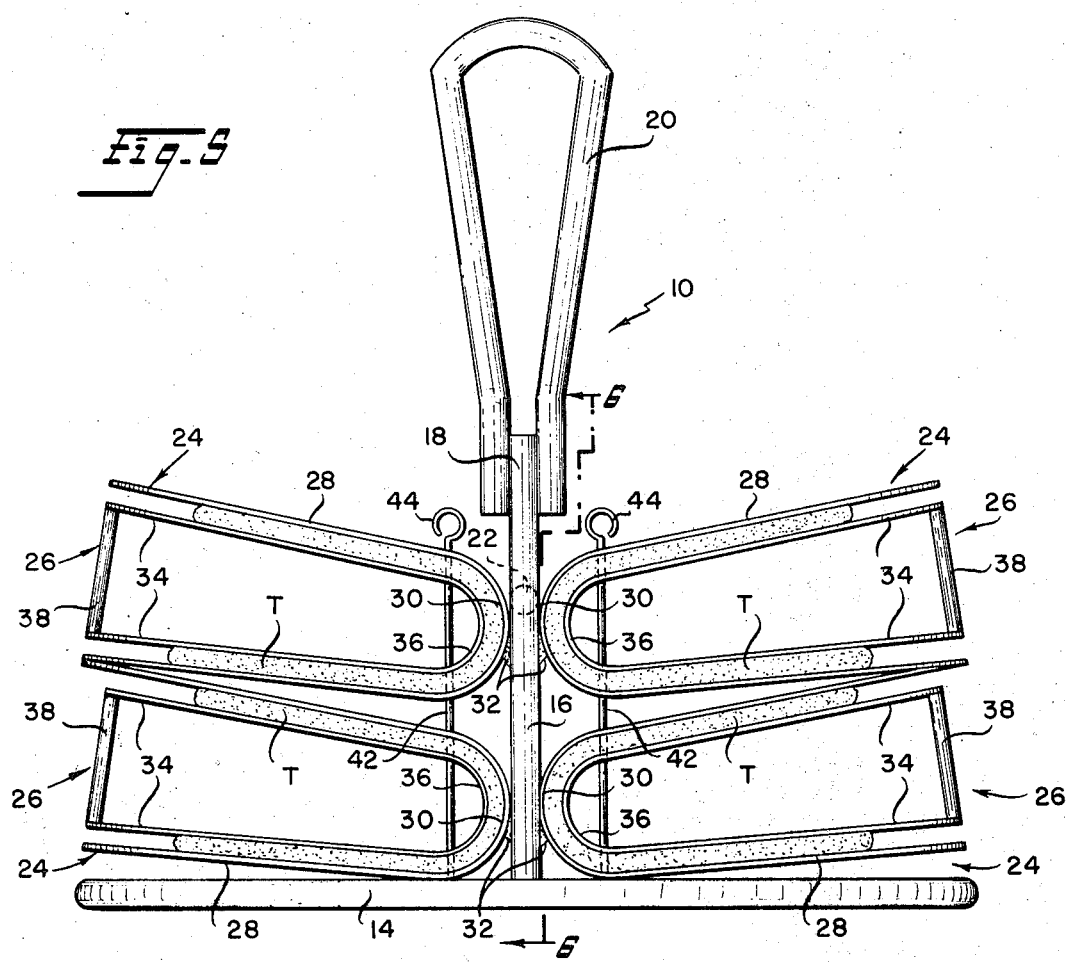
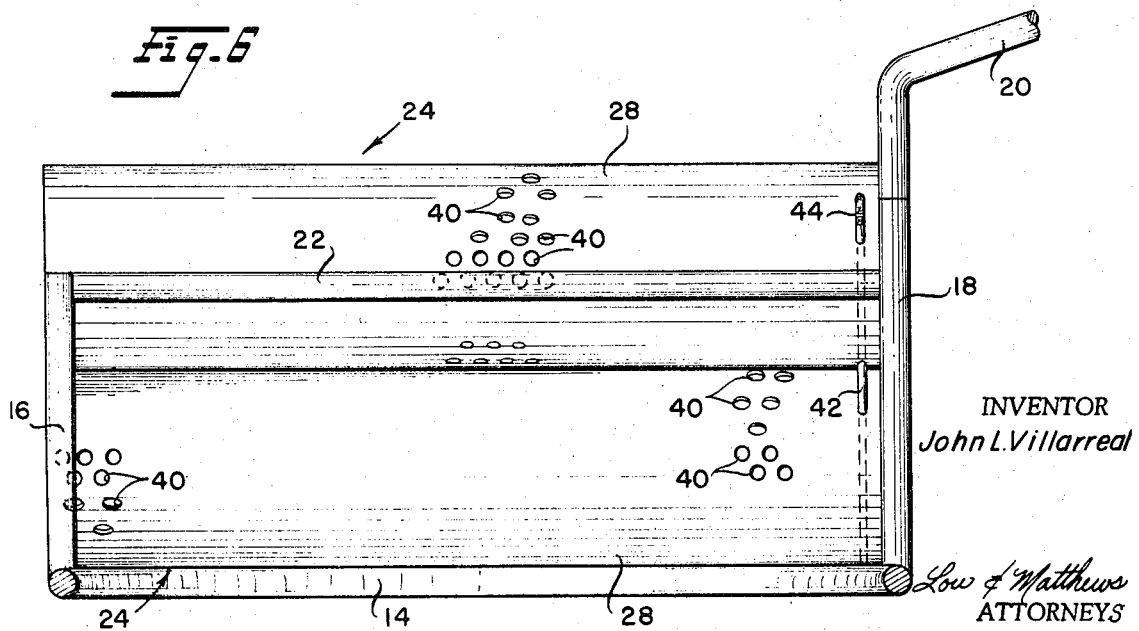

APPARATUS FOR FRYING TACO SHELLS

This invention relates to an apparatus for frying taco shells and, more particularly, to such an apparatus which is substantially circular in cross section whereby the apparatus is readily insertable into a saucepan or the like found in the home.

A number of devices have been available heretofore for frying taco shells for Mexican tortillas. These devices have been subject to a number of disadvantages and shortcomings. For example, the prior art devices have been relatively cumbersome and difficult to handle. Moreover, they have in general been noncircular in cross section so that they do not lend themselves to be readily inserted into a saucepan or kettle by the housewife for preparation of taco shells in the home. In addition, the prior art devices have been difficult to clean and they have not permitted individual attention to be given to each of the taco shells within a batch.

The foregoing disadvantages and shortcomings of the prior art are effectively overcome in accordance with the present invention in that a relatively compact apparatus is provided for frying taco shells which is circular in cross section so as to be readily insertable into saucepans, kettles and other like equipment found in the home. A removable inner mold structure is provided which facilitates easy cleaning of the apparatus. Finally, a mold structure is provided which permits individual frying of each taco shell so as to compensate for variation in cooking times caused by uneven thickness of product or an uneven application of heat.

Still another feature of the present invention is the provision of outer and inner molds, the outer ends of which are tilted slightly upwardly with respect to the horizontal thereby making the closed position of the molds the most stable position whereby the molds remain closed until it is desired to swing the inner mold out in order to remove the product therefrom or during storage of the apparatus.

The inherent advantages and improvements of the present invention will become more readily apparent upon considering the following detailed description of the invention and by reference to the drawings in which:

FIG. 5 is an end elevational view of the taco shell frying apparatus of FIG. 1 drawn to an enlarged scale; and, FIG. 6 is an elevational view taken in vertical cross section along line 6–6 of FIG. 5.

Figure 1:
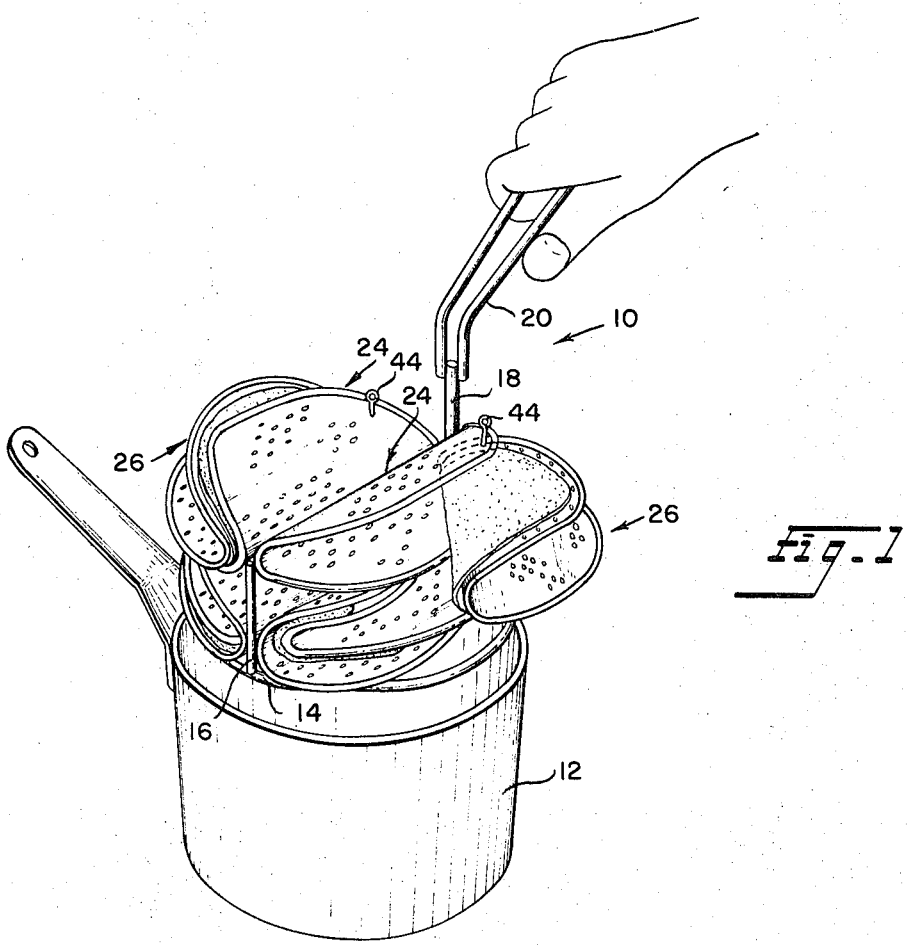
FIG. 1 is a perspective view of the taco shell frying apparatus illustrated above a cylindrical container.

Referring now to FIG. 1, there is illustrated a taco shell frying apparatus indicated generally at 10. The taco shell frying apparatus is pictured above a cylindrical container 12 which may conveniently be a saucepan, kettle or other household utensil.

Reference to FIGS. 5 and 6 illustrates that the taco shell drying apparatus 10 is provided with a circular base 14 comprising a circular rod structure to which is attached frame means comprising a front post 16 and a rear post 18. Front post 16 and rear post 18 are diametrically opposed and extend vertically upwardly from circular base 14.

A handle 20 is attached to one of the posts, such as to rear post 18. A horizontal bracing member 22 completes the frame construction and provides additional rigidity between front post 16 and rear post 18.

As can best be seen in FIG. 5, a plurality of substantially U-shaped outer mold members are indicated generally at 24 within each of which is received a substantially U-shaped inner mold member each indicated generally at 26. Each outer mold member 24 has a pair of legs 28 extending outwardly in substantially parallel relationship from a central web portion 30. The outer mold members 24 have their central web portions 30 attached to the front and rear posts 16, 18 by any suitable means such as by welding at 32. The attachment is made so that the legs 28 not only extend away from posts 16, 18 but also are tilted slightly upwardly from a horizontal plane parallel to base 14.

The inner mold members 26 comprise a pair of legs 34 which extend outwardly in substantially parallel relationship from a central web 36. If desired, additional strength may be provided for the inner mold members 26 by the use of a central bracing member 38 attached between the outermost portions of legs 34. It will be observed that each of the mold members 24 and 26 is provided with a plurality of holes 40 throughout its surface whereby the heating liquid may pass therethrough without obstruction.

Figure 2:
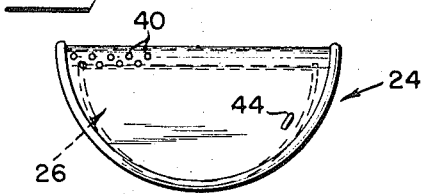
FIG. 2 is a top plan view of an individual outer and inner mold assembly in a closed position.
Figure 3:
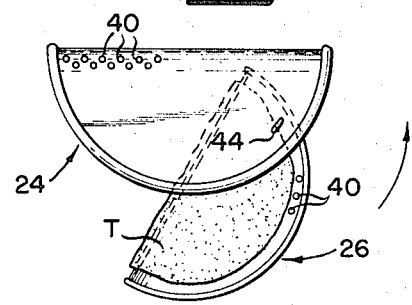
FIG. 3 is a top plan view of the mold assembly of FIG. 2 in a partially open position.

In order to provide a hinged securement of the inner mold members 26 with respect to the outer mold members 24, a removable pin 42 having a suitable head or loop 44 thereon passes through vertical alignment of holes 40 in each of the mold members in each set of stacked outer and inner molds 24, 26. As can be observed in FIGS. 1—4, each individual inner mold 26 may be swung out on an individual basis from within its associated outer mold 26 hinged about a pin 42. The taco dough material, indicated at T, is folded over the U-shaped inner mold 26 when it is in its fully open position as in FIG. 4 and pivoted or hinged to the FIG. 2 position after having passed through an intermediate position such as is shown in FIG. 3.

Figure 4:
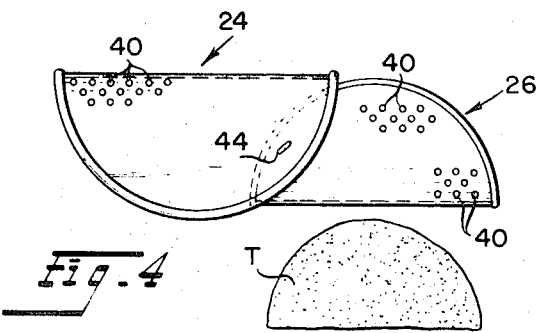
FIG. 4 is a top plan view of the mold assembly of FIG. 2 in a fully open position.

It will be observed that each set of vertically spaced outer and inner molds extend in opposite directions away from the diametrically opposed posts 16 and 18 so that the frying apparatus 10 is substantially circular in plan view. The legs of each of the molds are tilted slightly upwardly with respect to a horizontal plan parallel to base 14 whereby each inner mold 26 tends to remain in its closed position which is its most stable position. Because it is possible to swing each of the inner molds 26 out individually it is possible to monitor or observe the progress in frying of each taco shell and thereby compensate for any variation in thickness of taco dough material or in any temperature gradients or cold spots in the cooking fat. Since each outer and inner mold assembly is substantially semi-circular in plan view as seen in FIGS. 2—4, the taco shell frying apparatus may be used in connection with saucepans, kettles or other cylindrical utensils found in the home. This is desirable since it permits more widespread use of the apparatus within the home.

It is thought that the invention and many of its attendant advantages will be understood from the foregoing description, and it will be apparent that various changes may be made in the form, construction and arrangement of the parts without departing from the spirit and scope of the invention, the form hereinbefore described being merely a preferred embodiment thereof.

I claim:

1. An apparatus for frying taco shells comprising:
   a. a substantially circular base;
   b. frame means attached to said base and extending vertically upwardly therefrom;
   c. at least one U-shaped outer mold affixed to said frame means so as to have a pair of legs extending away from said frame means in one direction;
   d. at least one U-shaped outer mold affixed to said frame means so as to have a pair of legs extending away from said frame means in the opposite direction;
   e. a U-shaped inner mold received in each of said U-shaped outer molds;
   f. means to hinge each of said inner molds within a corresponding outer mold; and
   g. and handle means attached to said frame means.

2. An apparatus for frying taco shells as defined in claim 1 wherein a first set of vertically arranged outer molds extend in said one direction and a second set of vertically arranged outer molds extend in said opposite direction.

3. An apparatus for frying taco shells as defined in claim 2 wherein said means to hinge each of said inner molds within a corresponding outer mold comprises a vertically extending pin member which extends through each set of vertically arranged outer molds.

4. An apparatus for frying taco shells as defined in claim 2 wherein said outer and inner U-shaped molds are substantially semicircular in plan view.

5. An apparatus for frying taco shells as defined in claim 2 wherein the legs of said U-shaped outer and inner molds are tilted slightly upwardly with respect to a horizontal plane parallel to said base whereby each inner mold tends to remain within its associated outer mold.

6. An apparatus for frying taco shells as defined in claim 1 wherein said means to hinge each of said inner molds within a corresponding outer mold comprises a vertically extending pin member.

7. An apparatus for frying taco shells as defined in claim 6 wherein said outer and inner U-shaped molds are substantially semicircular in plan view.

8. An apparatus for frying taco shells as defined in claim 6 wherein the legs of said U-shaped outer and inner molds are tilted slightly upwardly with respect to a horizontal plane parallel to said base whereby each inner mold tends to remain within its associated outer mold.

9. An apparatus for frying taco shells as defined in claim 1 wherein said outer and inner U-shaped molds are substantially semicircular in plan view.

10. An apparatus for frying taco shells as defined in claim 9 wherein the legs of said U-shaped outer and inner molds are tilted slightly upwardly with respect to a horizontal plane parallel to said base whereby each inner mold tends to remain within its associated outer mold.

11. An apparatus for frying taco shells as defined in claim 1 wherein the legs of said U-shaped outer and inner molds are tilted slightly upwardly with respect to a horizontal plane parallel to said base whereby each inner mold tends to remain within its associated outer mold.

12. An apparatus for frying taco shells as defined in claim 1 wherein said frame means comprises a pair of posts extending upwardly from diametrically opposed positions on said base.